Dec. 21, 1943.                H. D. TIETZ                2,337,428
                           NICKEL HEATER CORD
                          Filed Dec. 31, 1941
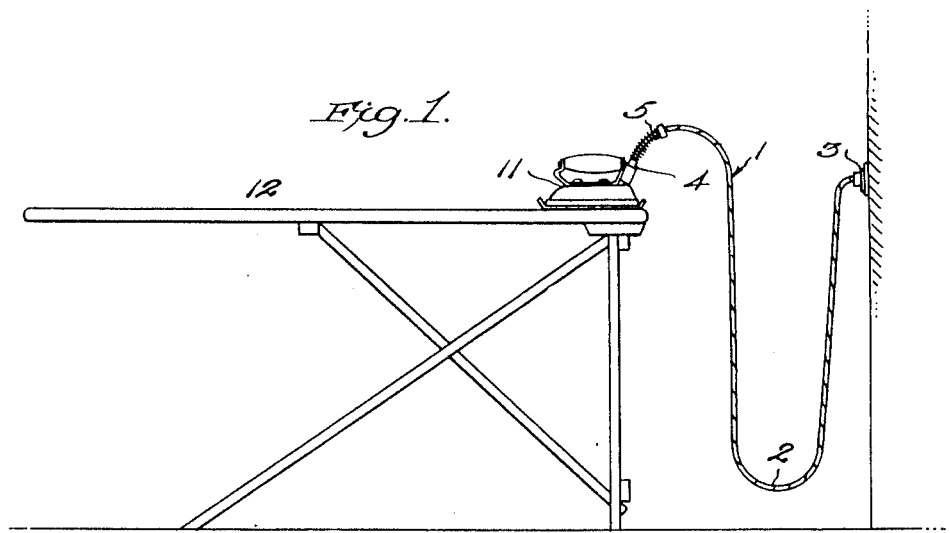
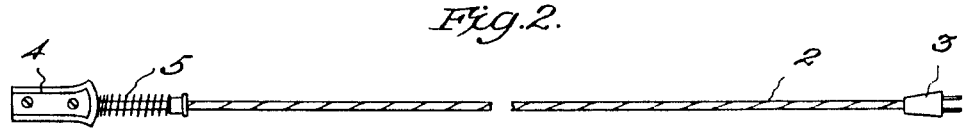
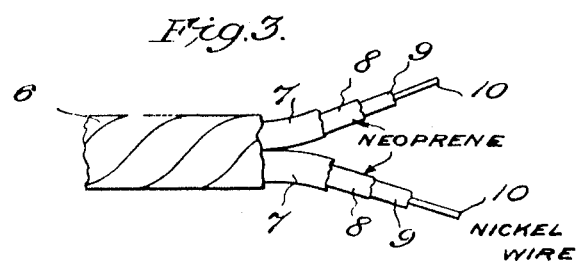
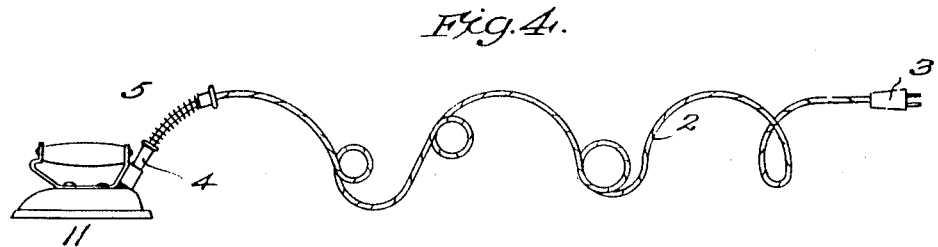
INVENTOR.
HERBERT D. TIETZ.
BY
ATTORNEY Patented Dec. 21, 1943

2,337,428

UNITED STATES PATENT OFFICE 2,337,428

NICKEL HEATER CORD

Herbert David Tietz, Maplewood, N. J., assignor to The International Nickel Co., Inc., New York, N. Y., a corporation of Delaware Application December 31, 1941, Serial No. 425,033

2 Claims. (Cl. 174—113)

The present invention relates to a heater cord for electric appliances, and, more particularly, to a heater cord comprising stranded nickel conductors.

Heater cords for electric appliances such as electric irons, toasters, waffle irons, and the like, have been made of rubber insulated conductors of stranded copper wires. The life of such heater cords was relatively short, principally due to breakage of the copper conductor. In most cases the breaks occurred near the appliance. Tests on electric iron cords have demonstrated that heat from the iron flowed out along the conductors for a distance of about 6 inches before being dissipated by radiation and other losses and at the temperatures reached in parts of this heated zone the resistance of copper to fatigue appears to drop much below that at room temperature. While the exact causes of failure in this region have not been definitely ascertained, it was generally believed by those skilled in the art that the failure was due to internal changes in the copper conductor in the heated area. The flexure of the wire in use as well as the heat from the appliance which flowed into the conductors may have contributed to the internal changes in its properties. Whether this explanation accounts for all the factors influencing the internal changes in the copper conductors is not known, but it was a matter of common knowledge that the copper adjacent to the failure had become very brittle. The rubber insulation, moreover, in the same heated region of the cord generally aged in use, became hard, lost its plasticity and in many cases cracks developed. If such cracks developed prior to the breaking of the copper conductor, it often happened that the two conductors in the cord were brought into contact with a resulting short circuit and failure of the cord.

I have discovered that the disadvantages of the rubber insulated copper cords may be largely overcome and that much improved results can be obtained, particularly longer life, by using stranded nickel wires in place of copper wires.

It is an object of the present invention to provide a heater cord having improved length of life.

It is another object of the present invention to provide electric cords for heating appliances having conductors substantially free from internal changes at the temperature to which the cords become heated in use.

Other objects and advantages of the present invention will become apparent from the following detailed description of the invention taken in conjunction with the accompanying drawing, in which:

Fig. 1 is an elevation showing the heater cord attached to a wall outlet and an electric iron;

Fig. 2 depicts a plan view of the heater cord itself;

Fig. 3 shows a fragmentary view of the heater cord with parts broken away to reveal the various elements thereof; and Fig. 4 is a diagrammatic illustration of the way in which a heater cord may be exposed in use to bending stresses.

Referring now more particularly to the drawing, reference character 1 designates the heater cord generally which is composed of a length of insulated wire or cord 2, a plug 3 for making electrical connection with a convenience outlet and a plug 4 for making electrical connection with the iron or other appliance. In conformity with conventional practice, the heater plug 4 is provided with a protecting spring 5 to reduce the intensity of bending stresses set up in the conductors adjacent to the heater plug.

The insulated cord preferably comprises an outer braided fabric layer 6 surrounding the two conductors which are preferably twisted together in conventional manner. Each conductor preferably is provided with a stranded asbestos covering 7, a layer of insulation 8, and a separator of cotton threads 9 surrounding a plurality of nickel wires or strands making up the conductor 10. The layer of insulation 8 may be made of rubber or any rubber-like material but preferably is neoprene.

The wire 10 preferably is made of commercially pure nickel. Satisfactory results have been obtained with cords made of nickel known to the trade as "A" nickel of which the following composition is typical:

|    | Per cent |
|----|----------|
| Ni [1] | 99.4 |
| Cu | 0.1 |
| Fe | 0.15 |
| Mn | 0.2 |
| Si | 0.05 |
| C  | 0.1 |
| S  | 0.005 |

[1] Includes cobalt.

The heater cord is illustrated in Fig. 1 for use with an electric iron 11 resting on an ironing board 12 but it will be understood that the heater cord may be used for any electric appliances, such as toasters, waffle irons, sandwich toasters, sun lamps, washing machines, vacuum cleaners, etc. The heater cord of the present invention however has its greatest utility and advantage in connection with heating appliances.

Experience has demonstrated that the heater cord of the present invention has substantially improved life, as compared with conventional copper heating cords, when used in connection with heating appliances such as electric irons, waffle irons, etc. The nickel cord when tested on the endurance testing machine for heater cords as specified in the appendix of the "Standard for Flexible Cord and Fixture Wire" of October, 1935, was found to endure a larger number of cycles before failure than commercial copper heater cords. Moreover, the nickel cords of the present invention were found to suffer far less from the effects of heat than the copper cords. For example, samples of the nickel cord of the present invention insulated with neoprene and standard copper cords insulated with rubber were aged for 30 days in an oven held at 90° C. and were then subjected to the endurance test mentioned hereinabove. It was found that the average number of cycles prior to failure which several specimens of copper cords endured under these different set-ups was only about 75% of the average number endured under identical test conditions by unaged copper cords. The aged nickel cords, on the contrary, tested under identical conditions endured on the average slightly more cycles than unaged nickel cords. Moreover, at the end of the 30 day aging period the rubber insulation in the copper cord had become hard, cracked and its plasticity was gone. The rubber in these samples was unvulcanized but it is well known to those skilled in the art that the unvulcanized rubber withstands heat far better than vulcanized rubber. The neoprene insulation in the heater cords of the present invention was unchanged in appearance, was intact and still retained its plasticity and flexibility after the 30 days aging at 90° C.

It will be seen from the foregoing description of the present invention that the novel nickel heater cord possesses substantially improved life as compared with standard copper heater cords. The danger of short circuits due to hardening and cracking of the insulation may be substantially eliminated by the use of neoprene insulation. The nickel cord of the present invention has received the recommendation of the Underwriters' Laboratories, Inc.

Although the present invention has been described in connection with certain specific embodiments, it will be understood that modifications and variations within the scope of the following claims are contemplated.

I claim:

1. A cord for connecting an electric heating appliance to a source of electric current, comprising insulated stranded conductors made of nickel.

2. In a heater cord for electrical appliances, comprising a pair of insulated electrical conductors, an outlet plug electrically connected to one end of said cord, and an appliance plug electrically connected to the other end of said cord; the improvement which comprises a pair of two insulated stranded nickel conductors.

HERBERT DAVID TIETZ.